United States Patent
DiCicco

(10) Patent No.: US 9,010,676 B2
(45) Date of Patent: Apr. 21, 2015

(54) DISPENSER FOR FISHING LINE

(76) Inventor: Anthony Paul DiCicco, Aliquippa, PA (US)

( * ) Notice: Subject to any disclaimer, the term of this patent is extended or adjusted under 35 U.S.C. 154(b) by 330 days.

(21) Appl. No.: 13/540,577

(22) Filed: Jul. 2, 2012

(65) Prior Publication Data

US 2013/0001353 A1    Jan. 3, 2013

Related U.S. Application Data

(60) Provisional application No. 61/503,926, filed on Jul. 1, 2011.

(51) Int. Cl.
    *B65H 75/28*     (2006.01)
    *A01K 89/00*     (2006.01)
    *A01K 97/06*     (2006.01)

(52) U.S. Cl.
    CPC ........................... *A01K 97/06* (2013.01)

(58) Field of Classification Search
    CPC . A01K 89/00; A01K 89/003; A01K 89/0111; B65H 75/18; B65H 75/28
    USPC ................ 242/588, 588.1, 588.3, 388, 388.1, 242/388.6, 378.4, 405
    See application file for complete search history.

(56) References Cited

U.S. PATENT DOCUMENTS

| | | | | |
|---|---|---|---|---|
| 718,172 | A * | 1/1903 | Tennis | 242/375.1 |
| 1,663,083 | A * | 3/1928 | Kavle | 242/378.4 |
| 1,837,234 | A * | 12/1931 | Salzman | 242/379.2 |
| 3,474,985 | A * | 10/1969 | Cromer et al. | 242/378.4 |
| 4,121,785 | A * | 10/1978 | Quenot | 242/396.9 |
| 4,998,685 | A * | 3/1991 | Spencer | 242/137 |
| 5,915,640 | A * | 6/1999 | Wagter et al. | 242/388.1 |
| 6,874,722 | B2 * | 4/2005 | Wei | 242/378 |
| 7,918,413 | B2 * | 4/2011 | Odderson | 242/395 |
| 8,720,810 | B2 * | 5/2014 | Whitaker | 242/388.6 |

* cited by examiner

*Primary Examiner* — William A Rivera

(57) ABSTRACT

A device solves problems associates with the storage, transport and subsequent dispensing of fishing line, such as fly fishing monofilament leader material. Leader material of choice can be loaded onto the independently rotating spools, fastened to side plates with proprietary quick-release locking pins, and dispensed from a single, compact, portable station. The device is modular in design and can accommodate various quantities of spools which rotate about the side plates on an integral boss. The user is not limited to a particular manufacturer's brand of monofilament material and re-use of the device is unlimited. Moreover, the user can purchase leader material in larger spools, rather than smaller tippets, winding a spool of the device of the present invention with a desired amount of fishing line.

10 Claims, 3 Drawing Sheets

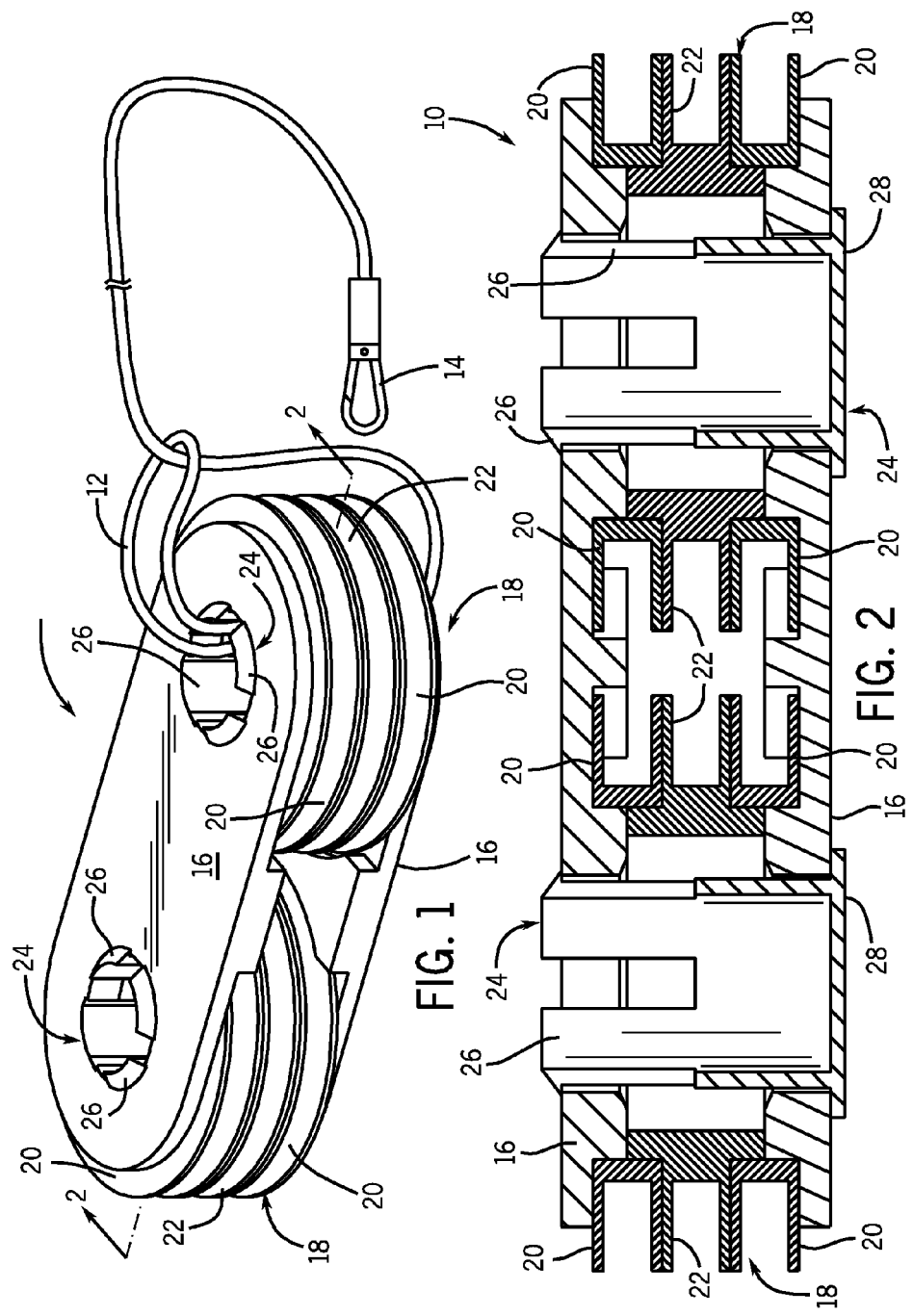

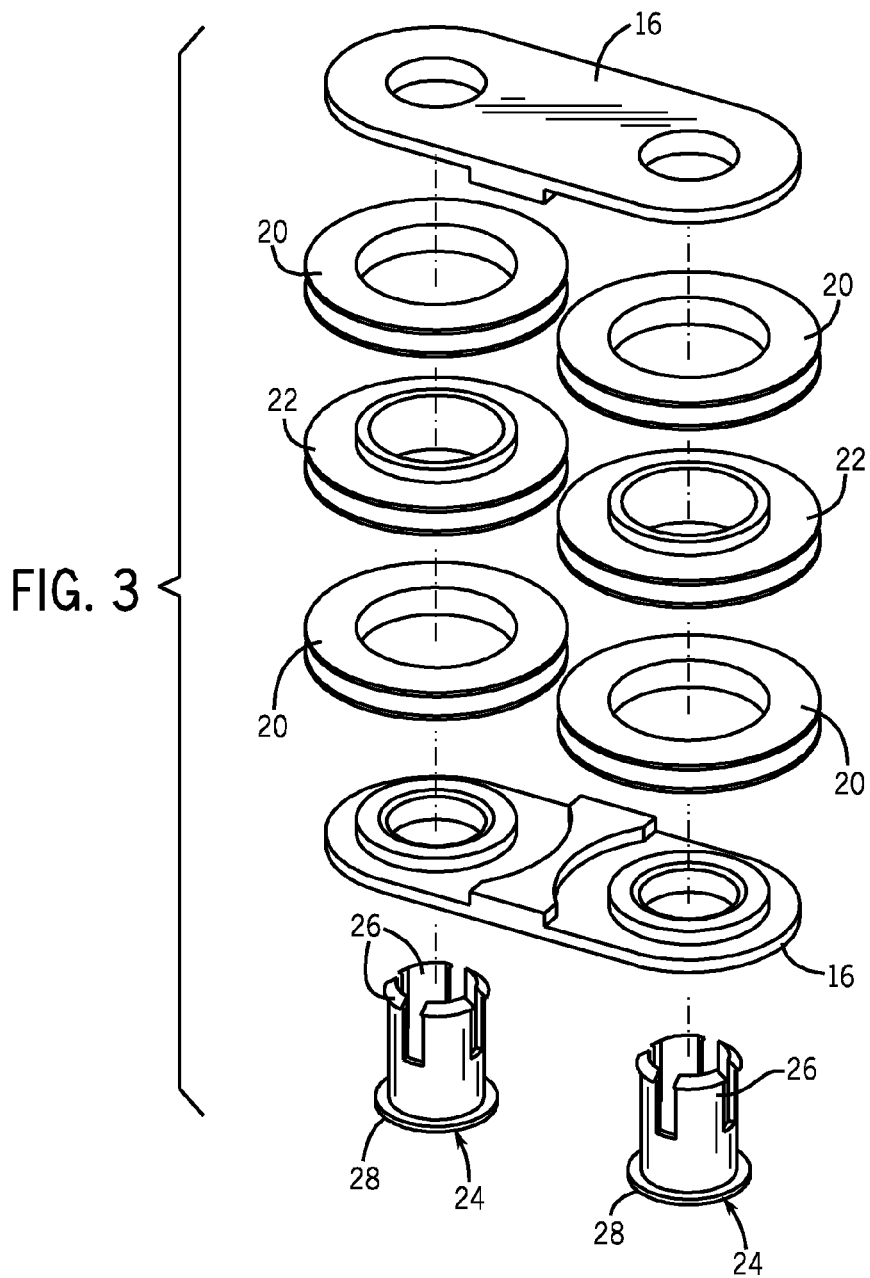

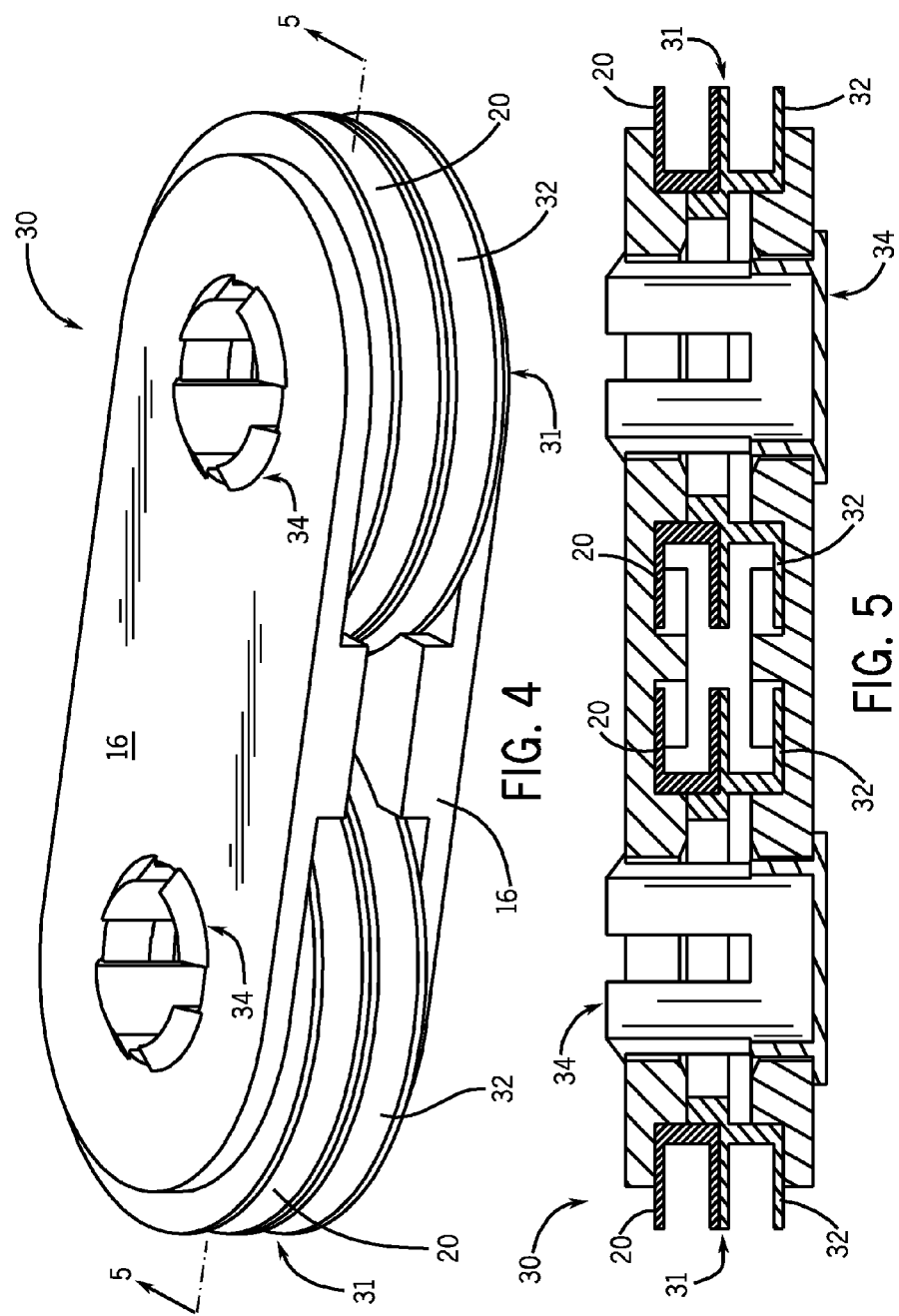

DISPENSER FOR FISHING LINE

CROSS-REFERENCE TO RELATED APPLICATION

This application claims the benefit of priority of U.S. provisional application No. 61/503,926, filed Jul. 1, 2011, the contents of which are herein incorporated by reference.

BACKGROUND OF THE INVENTION

The present invention relates to a fishing accessories and, more particularly, to a compact dispenser for fishing leader material.

Currently, fly fishing leader line is stored on tippets that can be cumbersome to use and operate and are separately retrieved for different sized lines. When a fisherman needs a leader line, they must first find the correct sized line container, unspool a desired quantity, cut the line to length and then secure the line and put the spool away. This operation can typically take several minutes.

While devices are known that can hold multiple spools, these devices have historically resembled a box or other housing which retains the spools and dispenses material through portholes. These devices are generally bulky and do not provide an ease of use or replacement of line.

As can be seen, there is a need for an improved device for holding and dispensing various sizes or styles of fishing lines, such as fly fishing leader lines.

SUMMARY OF THE INVENTION

In one aspect of the present invention, a dispenser for fishing line comprises a plurality of spools forming a spool unit; first and second side plates sandwiching first and second ones of the spool unit; a first locking pin extending through the first side plate, the first spool unit, and the second side plate; and a second locking pin extending through the first side plate, the second spool unit, and the second side plate, wherein the first and second locking pins secure the first side plate with the second side plate, with the spool units disposed therebetween.

In another aspect of the present invention, a dispenser for fishing line comprises first and second spool units including two spools on each spool unit; first and second side plates sandwiching the first and second spool units; a first locking pin extending through the first side plate, the first spool unit, and the second side plate; a second locking pin extending through the first side plate, the second spool unit, and the second side plate; a flange on a first end of the first and second locking pins, the flange preventing the first and second locking pins from moving through the first side plate; and a set of barbed legs on a second end of the first and second locking pins, the barbed legs engaging the second side plate, wherein the first and second locking pins secure the first side plate with the second side plate, with the spool units disposed therebetween.

In a further aspect of the present invention, a dispenser for fishing line comprises first and second spool units including three spools on each spool unit; first and second side plates sandwiching the first and second spool units; a first locking pin extending through the first side plate, the first spool unit, and the second side plate; a second locking pin extending through the first side plate, the second spool unit, and the second side plate; a flange on a first end of the first and second locking pins, the flange preventing the first and second locking pins from moving through the first side plate; and a set of barbed legs on a second end of the first and second locking pins, the barbed legs engaging the second side plate, wherein the first and second locking pins secure the first side plate with the second side plate, with the spool units disposed therebetween.

These and other features, aspects and advantages of the present invention will become better understood with reference to the following drawings, description and claims.

BRIEF DESCRIPTION OF THE DRAWINGS

FIG. 1 is a perspective view of a six-spool fishing line dispenser according to an exemplary embodiment of the present invention;

FIG. 2 is a cross-sectional view taken along line 2-2 of FIG. 1;

FIG. 3 is an exploded perspective view of the six-spool fishing line dispense of FIG. 1;

FIG. 4 is a perspective view of a four-spool fishing line dispenser according to another exemplary embodiment of the present invention; and FIG. 5 is a cross-sectional view taken along line 5-5 of FIG. 4.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a device that solves problems associates with the storage, transport and subsequent dispensing of fishing line, such as fly fishing monofilament leader material. Leader material of choice can be loaded onto the independently rotating spools, fastened to side plates with proprietary quick-release locking pins, and dispensed from a single, compact, portable station. The device is modular in design and can accommodate various quantities of spools which rotate about the side plates on an integral boss. The user is not limited to a particular manufacturer's brand of monofilament material and re-use of the device is unlimited. Moreover, the user can purchase leader material in larger spools, rather than smaller tippets, winding a spool of the device of the present invention with a desired amount of fishing line.

Referring now to FIGS. 1 through 6, a six-spool dispenser 10 is shown. The dispenser 10 can include side plates 16 that sandwich two sets of three spools 18. First and second locking pins 24 can be inserted through a first side plate 16, through holes in a first outer spool 20, an inner spool 22, and a second outer spool 20, before passing through the second side plate 16. Barbed legs of the locking pins 24 can retain hook into the second side plate 16 to prevent the locking pin 24 from pulling out. A flange 28 can be disposed on the locking pin 24, opposite the end of the barbed legs 26. The flange 28 can prevent the locking pin 24 from being pushed through the first side plate 16. The locking pins 24 allows the spools 20, 22 to rotate thereabout while holding the side plates 16 in place to sandwich he spools 20, 22.

The spools 20, 22 can be filled with fishing line by various means. For example, a user can press a winding mandrel into the spools 20, 22 and rote the spools 20, 22 either by hand or with a power drill. Once the spools are filled, they are placed between the side plates 16 and held firmly together by the locking pins 24.

The fishing line on the filled spools can be held in place by various means. For example, a rubber band can be disposed over the spool to hold the line in place. In some embodiments, a spool unthreading device, such as The Shark Tooth band from Fly Fishing Xtreme of Simi Valley California. The Shark Tooth band is an elastic band which retains material and also cuts it.

A lanyard 12 can be connected to the device 10 and a carabineer 14 can be connected to the lanyard 12 to secure the device 10 and prevent loss thereof.

The outer spools 20 can be designed with inside holes that accept a raised donut portion on the side plate 16. The inner spool 22 can include a flange that fits into the holes of the outer spool 20. This design is shown, for example, in FIG. 3. The spools 20, 22 can fit together so that the individual spools rotate independently. The components, together, provide a complete system for storage, dispensation and transportation of an entire leader building kit in one small package.

Referring to FIGS. 4 and 5, a four-spool dispenser 30 is shown. The four-spool dispenser 30 can be assembled similarly to the six-spool dispenser 10, described above, however, locking pins 34 of the four-spool dispenser 30 are shorter than the locking pins 24 of the six-spool dispenser 10.

Double spool units 31 can be disposed between side plates 16. The double spool units 31 and include an outer spool 20 and a second spool 32.

The dispensers 10, 30 of the present invention can be made from various materials using various manufacturing methods. For example, the dispensers 10, 30 can be made of metal, such as aluminum, plastic, composite, carbon fiber, or the like. In some embodiments, the dispensers 10, 30 can be made from injection molded nylon and polypropylene.

When a fly fisherman has need to construct, modify or re-build a fly fishing leader, they need only to select the proper size of monofilament from the device of the present invention, pull the required amount from the spool, and cut it to length. Prior to the device of the present invention, individual spools were carried in pockets or boxes, which first had to be identified and selected and material was then withdrawn, cut with a pair of clippers or scissors, and placed back into a respective pocket or container before another size of material could be accessed. With the device of the present invention, all material is immediately accessed from one source, as it is also dispensed and cut from the same. What formerly required several minutes to accomplish is now done in a matter of seconds.

It should be understood, of course, that the foregoing relates to exemplary embodiments of the invention and that modifications may be made without departing from the spirit and scope of the invention as set forth in the following claims.

What is claimed is:

1. A dispenser for fishing line comprising:
a first plurality of spools forming a first spool unit, each of the first plurality of spools designed and configured to contain fishing line;
a second plurality of spools forming a second spool unit, each of the second plurality of spools designed and configured to contain fishing line;
first and second side plates together sandwiching the first and the second spool units;
a first locking pin extending through the first side plate, the first spool unit, and the second side plate, allowing the first spool unit to rotate freely on the first locking pin; and
a second locking pin extending through the first side plate, the second spool unit, and the second side plate, allowing the second spool unit to rotate freely on the second locking pin independently of the first spool unit;
wherein the first and the second locking pin secure the first side plate with the second side plate, with the first and the second spool units disposed therebetween.

2. The dispenser of claim 1, further comprising a flange on a first end of each of the first and second locking pins, the flange preventing the first and second locking pins from moving through the first side plate.

3. The dispenser of claim 2, further comprising a set of barbed legs on a second end of each of the first and second locking pins, the barbed legs engaging the second side plate to secure the first side plate to the second side plate.

4. The dispenser of claim 1, further comprising a lanyard connected to the dispenser.

5. The dispenser of claim 4, further comprising a carabineer connected to the lanyard.

6. The dispenser of claim 1, wherein the first spool unit includes two independently rotating spools.

7. The dispenser of claim 1, wherein the first spool unit includes three independently rotating spools.

8. A dispenser for fishing line comprising:
first and second spool units each including two spools on each spool unit, each of the spools designed and configured to contain fishing line;
first and second side plates sandwiching the first and second spool units;
a first locking pin extending through the first side plate, the first spool unit, and the second side plate, allowing the first spool unit to rotate freely on the first locking pin;
a second locking pin extending through the first side plate, the second spool unit, and the second side plate, allowing the second spool unit to rotate freely on the second locking pin independently of the first spool unit;
a flange on a first end of each of the first and second locking pins, the flange preventing the first and second locking pins from moving through the first side plate; and
a set of barbed legs on a second end of each of the first and second locking pins, the barbed legs engaging the second side plate, wherein the first and second locking pins secure the first side plate with the second side plate, with the spool units disposed therebetween.

9. The dispenser of claim 8, further comprising:
a lanyard connected to the dispenser; and
a carabineer connected to the lanyard.

10. A dispenser for fishing line comprising:
first and second spool units each including three spools on each spool unit, each of the spools designed and configured to contain fishing line;
first and second side plates sandwiching the first and second spool units;
a first locking pin extending through the first side plate, the first spool unit, and the second side plate, allowing the first spool unit to rotate freely on the first locking pin;
a second locking pin extending through the first side plate, the second spool unit, and the second side plate, allowing the second spool unit to rotate freely on the second locking pin independently of the first spool unit;
a flange on a first end of each of the first and second locking pins, the flange preventing the first and second locking pins from moving through the first side plate; and
a set of barbed legs on a second end of each of the first and second locking pins, the barbed legs engaging the second side plate, wherein the first and second locking pins secure the first side plate with the second side plate, with the spool units disposed therebetween.

* * * * *